United States Patent
Liu et al.

(10) Patent No.: US 11,523,338 B2
(45) Date of Patent: Dec. 6, 2022

(54) WLAN COEXISTENCE WITH OTHER STANDARDS USING COMMUNICATIONS MASK ALIGNED WITH TARGET WAKE TIME

(71) Applicant: Cypress Semiconductor Corporation, San Jose, CA (US)

(72) Inventors: Wenyu Liu, Lake Forest, CA (US); Raghunatha Kondareddy, Fremont, CA (US); Xianmin Wang, Westfield, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 174 days.

(21) Appl. No.: 17/124,674

(22) Filed: Dec. 17, 2020

(65) Prior Publication Data
US 2021/0297949 A1    Sep. 23, 2021

Related U.S. Application Data

(60) Provisional application No. 62/991,154, filed on Mar. 18, 2020.

(51) Int. Cl.
*H04W 4/80* (2018.01)
*H04W 52/02* (2009.01)
*H04W 56/00* (2009.01)
*H04W 84/12* (2009.01)

(52) U.S. Cl.
CPC .......... *H04W 52/0216* (2013.01); *H04W 4/80* (2018.02); *H04W 52/0235* (2013.01); *H04W 56/001* (2013.01); *H04W 84/12* (2013.01)

(58) Field of Classification Search
CPC ..................................................... H04L 12/28
USPC ............................................................ 370/329
See application file for complete search history.

(56) References Cited

U.S. PATENT DOCUMENTS 11,330,525 B2 *    5/2022    Atefi ................... H04W 52/365

* cited by examiner

*Primary Examiner* — Dang T Ton

(57) ABSTRACT

A method can include negotiating a target wake time (TWT) with a TWT session period (TWT SP) duration and generating mask data that inhibits communications according to a second standard during at least a portion of TWT SP. A method can further include, by operation of second communication circuits, generating a communications mask from mask data received from WLAN circuits, in response to the timing signal, synchronizing the communications mask with the TWT SP, and in response to the communications mask, inhibiting communications according to the second standard during at least a portion of the TWT SP. Corresponding devices and systems are also disclosed.

20 Claims, 14 Drawing Sheets

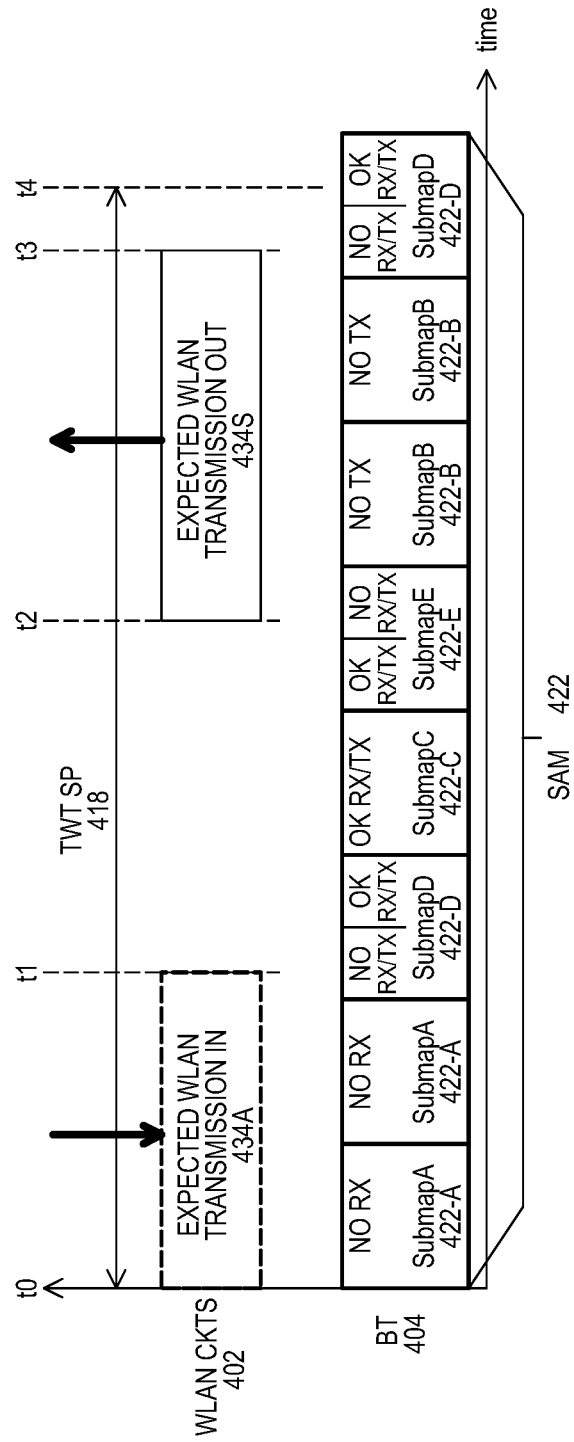

(BACKGROUND)

| Bluetooth Slot | M | S | M | S | M | S | M |
|---|---|---|---|---|---|---|---|
| Can Transmit | ✗ | ✓ | ✓ | ✗ | ✗ | ✓ | ✓ |
| Can Receive | ✓ | ✗ | ✓ | ✗ | ✓ | ✓ | ✗ |
| Type Code | 2 | 1 | 3 | 0 | 1 | 3 | 2 |

FIG. 14A
(BACKGROUND)

| Slot type code | Meaning |
|---|---|
| 0 | The slot is not available for either transmission or reception |
| 1 | The slot is available for transmission but not reception |
| 2 | The slot is available for reception but not transmission |
| 3 | The slot is availalbe for both transmission and reception |

FIG. 14B
(BACKGROUND)

WLAN COEXISTENCE WITH OTHER STANDARDS USING COMMUNICATIONS MASK ALIGNED WITH TARGET WAKE TIME

RELATED APPLICATIONS

This application claims the benefit of U.S. provisional patent application having Ser. No. 62/991,154, filed on Mar. 18, 2020, the contents of which are incorporated by reference herein.

TECHNICAL FIELD

The present disclosure relates generally to wireless devices, and more particularly to wireless devices having collocated communication circuits that share a wireless medium but operate according to different standards or protocols.

BACKGROUND

Providing different wireless communication circuits on a same circuit component can provide cost-effective, compact and power efficient solutions to devices that communicate according to different standards. Such devices can be referred to as combination devices. As one example, a combination device can include circuits compatible with one or more IEEE 802.11 wireless standards (WLAN circuits) and communication circuits compatible with a second standard, such as a Bluetooth standard (BT circuits).

In a conventional WLAN/BT combination device WLAN and BT circuits can share radio frequency (RF) components (e.g. antenna, low noise amplifier). As a result, communications by the WLAN and BT circuits must "coexist" with respect to the shared transmission medium. In some conventional devices, WLAN radio circuits and BT radio circuits are forced to divide their usage in a time division multiplex fashion. Conventionally, each communication circuit (i.e., WLAN or BT) has their own scheduled time of medium usage, as it can be hard to predict and synchronize sharing of the medium, especially when multiple BT connections are present. Even when overall air time is sufficient for both BT circuits and WLAN circuits, conflict still arises due to lack of synchronization. Instantaneous arbitration is needed at the time of conflict, often sacrificing access for one communication circuit, making medium usage inefficient.

In limited cases where medium usage is deterministic (e.g., a single BT connection in sniff state), the clock drift between BT circuits and WLAN circuits makes synchronization difficult to maintain over a long time.

Target Wake Time (TWT) is a mechanism used in the IEEE 802.11ax standard. TWT provides data transfer sessions consisting of synchronous and periodic Session Periods (TWT SPs) when WLAN devices wake up to exchange data. The active time and duration of TWT SPs are negotiated between WLAN devices involved and are deterministic once agreed upon. This provides a predictable and periodic pattern of medium access for WLAN circuits.

FIG. 13 is a timing diagram showing conventional TWT operations. In response to a beacon issued by an access point (AP), a station (STAi) can enter a TWT negotiation 1301 with the AP. As a result of the negotiation, a TWT can be established having a periodic wake up interval 1307. At each TWT interval, a TWT SP 1303 can occur in which STAi and AP can communicate.

Within TWT SP 1303, following a back off period (BO), time can be allocated to enable AP to transmit downlink data 1334A to STAi. STAi can acknowledge (ACK) such downlink data 1334A. Also within TWT SP 1303 following another BO, time can be allocated to enable STAi to transmit uplink data 1334S to AP. AP can issue an ACK in response. Such data transfer periods between AP and STAi can form part of the expected WLAN traffic for the TWT SP.

The BT Specification 5.0 introduced a slot availability mask (SAM) to the BT standard. A SAM defines the availability of BT time slots for BT data transmission and/or reception. The specification allows a SAM slot map to originate from an external condition, (e.g., BT communications having to coexist with cellular communications, such as LTE) or from internal condition (e.g., topology management for a BT scatternet). Built-in mechanisms exist to schedule BT data transfer, and hence medium access. Thus, a SAM can be used to mark some BT slots as unavailable for BT transmission and/or reception so that BT circuit's built-in scheduler can arrange data transfer accordingly.

A SAM map can give detailed access (send-only, receive-only, both, none) on a slot basis, enabling granular access control of BT transmissions. A SAM also provides a way to determine the start (anchor point) and duration of the SAM, enabling the precise timing control of BT medium access.

FIGS. 14A and 14B are diagrams showing SAM slot marking and slot codes according to the BT standard. FIG. 14A shows slot designations for a SAM. Slots alternate as master (M) and slave (S) slots. Based on a slot type code, shown in FIG. 14B, BT communications for each slot can be controlled according to the SAM.

One conventional approach to WLAN/BT coexistence involves synchronizing WLAN operations to BT operations. In such conventional devices, a periodic BT medium request can be used to determine a TWT Wake time and to set up TWT sessions. However, such an approach can only work if BT medium requests are synchronous and periodic, which greatly limits the flexibility of a resulting system.

It would be desirable to arrive at some way of sharing a medium between IEEE 802.11 compatible circuits and another collocated communication circuit, such a BT communication circuit.

BRIEF DESCRIPTION OF THE DRAWINGS

FIGS. 4A and 4B are diagrams of BT SAM submaps and a BT SAM for a TWT SP, according to embodiments.

FIGS. 14A and 14B are tables showing slots of a SAM, and slot types according to the BT standard.

DETAILED DESCRIPTION

Figure 1A:
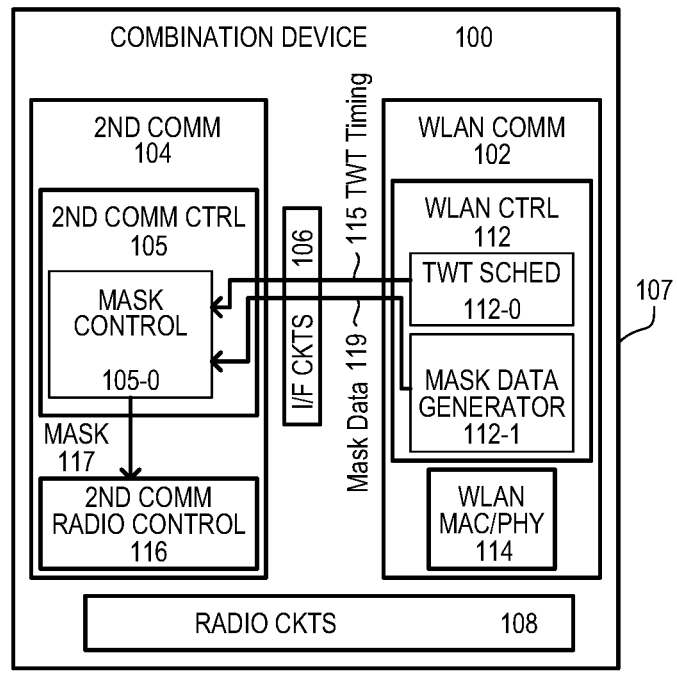
FIGS. 1A and 1B are diagrams showing a system and operations of a combination device according to an embodiment.

According to embodiments a combination device can include circuits compatible with one or more IEEE 802.11 wireless standards (WLAN circuits) and second communication circuits compatible with another wireless standard. WLAN circuits can negotiate a target wake time (TWT) having a TWT session (or service) period (TWT SP) and then generate mask data and a timing signal that indicates the start of a TWT SP. Based on the mask data and timing signal, second communication circuits can inhibit communications according the second standard during the TWT SP.

In some embodiments, WLAN circuits can have expected WLAN traffic data for the TWT SP and generate mask data that varies according to the WLAN traffic data. Consequently, second communication circuits can selectively inhibit communications according the second standard based on WLAN traffic data.

In some embodiments, mask data corresponding to a TWT SP can mask inhibit reception according to the second standard while WLAN transmission is expected and/or inhibit transmission according to the second standard while WLAN reception is expected.

In some embodiments, during the TWT SP, second communication circuits can inhibit reception of signals according to the second standard when incoming WLAN transmissions are expected.

In some embodiments, during the TWT SP, second communication circuits can inhibit transmission of signals according to the second standard when outgoing WLAN transmissions are expected.

In some embodiments, second communication circuits can be BT circuits compatible with one or more Bluetooth (BT) standards, including Bluetooth Low Energy (BT circuits). Mask data from WLAN circuits can be used to generate a BT Slot Availability Mask (SAM). The SAM can have a duration (TSAM) no less than the TWT SP. A SAM can be synchronized with a TWT SP based on the timing signal from the WLAN circuits.

In some embodiments, WLAN and second communication circuits can be formed in a same integrated circuit (IC) package.

In some embodiments, WLAN and second communication circuits can be formed with a same IC substrate.

In the various embodiments described herein, like items are referred to by the same reference characters, but with the leading digit(s) corresponding to the figure number.

Figure 1B:
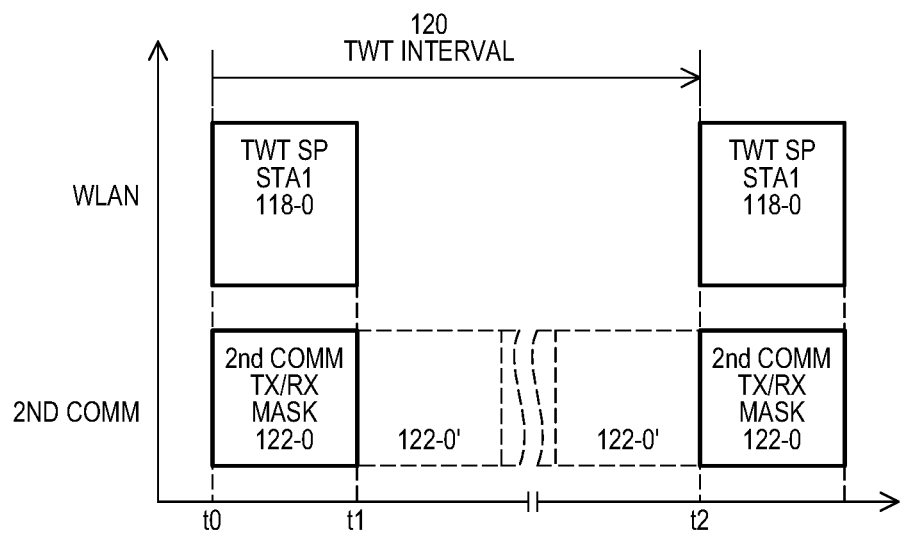

FIG. 1A and 1B are diagrams showing a combination device and corresponding communication operations according to an embodiment. FIG. 1A is a block diagram of a combination device 100 according to an embodiment. FIG. 1B is a timing diagram showing coexistence operations for WLAN transmission (WLAN) and transmissions according to another standard ($2^{ND}$ COMM).

Referring to FIG. 1A, a combination device 100 can include WLAN circuits 102, second communication circuits 104, interface circuits 106, and radio circuits 108. WLAN circuits 102 can be compatible with at least one IEEE 802.11 wireless communication standard, and in some embodiments, can be compatible with the IEEE 802.11ax and/or IEEE 802.11ah standard. Second communication circuits 104 can be compatible with a second standard that is not an IEEE 801.11 wireless standard. WLAN circuits 102 and second communication circuits 104 can be collocated in a same device structure 107. In some embodiments, a device structure 107 can be one IC package. In some embodiments, a device structure 107 can be one IC substrate.

WLAN circuits 102 and second communication circuits 104 can operate across radio frequency (RF) bands that overlap. Consequently, WLAN communications and communications according to the second standard can coexist by sharing a range of RF frequencies. In some embodiments, WLAN circuits 102 and second communication circuits 104 can share all or a portion of the ISM 2.4 GHz band. Interface circuits 106 can facilitate the transfer of data between the WLAN circuits 102 and second communication circuits 104. Radio circuits 108 can generate appropriate signals for transmitting and receiving data for WLAN circuits 102 and second communication circuits 104.

WLAN circuits 102 can include a WLAN control section 112 and WLAN media access control and WLAN physical (MAC/PHY) circuits 114. WLAN control section 112 can control WLAN operations, and in the embodiment shown, can include a TWT scheduler 112-0 and mask data generator 112-1. A TWT scheduler 112-0 can communicate with one or more other devices to negotiate a TWT for combination device 100. Such negotiation can result in establishing a TWT having a TWT SP, and in some embodiments, can include determining expected WLAN traffic data for the TWT SP. TWT scheduler 112-0 can generate a timing signal 115 which can indicate the start of a TWT SP. Timing signal 115 can be transmitted to second communication circuits 104 over interface circuits 106. Mask data generator 112-1 can generate mask data for inhibiting wireless communications by second communications circuit during all or portions of a TWT SP. In some embodiments, WLAN traffic for the negotiated TWT SP is known, and mask data can vary according to such WLAN traffic data. Mask data 119 can be sent to second communication circuits 104 over interface circuits 106.

Second communication circuits 104 can include second communications controller 105 and second radio control circuits 116. Second communication controller 105 can include mask control circuit 105-0. Mask control circuit 105-0 can apply a mask 117 to second communication radio control circuits 116 to inhibit communications according to the second standard. Mask control circuits 105-0 can synchronize a mask 117 with a TWT SP based on timing signal 115. In some embodiments, a mask 117 can be timed to take effect at the start of the TWT SP. In some embodiments, mask control circuits 105-0 can create a mask 117 having a duration essentially equal to the TWT SP. In some embodiments, a mask 117 can inhibit transmission or reception according to the second standard based on expected WLAN traffic during the TWT SP.

Referring to FIG. 1B, a timing diagram shows communications according to WLAN section (WLAN) and second communication circuits ($2^{nd}$ COMM). In FIG. 1B it is assumed that WLAN circuits 102 have negotiated a TWT having a TWT interval 120 with another device. In some embodiments, this can include WLAN circuits 102 operating as a station (STA) in a basic service set (BSS). However, in other embodiments, WLAN circuits 102 can operate as an access point (AP) in a BSS.

At time t0, a TWT SP 118-0 can start. At the same time, a mask 122-0 for communications according to a second standard, can also begin. During TWT SP 118-0 WLAN communications can take place between combination device 100 and another device. Communications can include transmission and/or reception of protocol data units (PDU). During TWT SP 118-0, a second communications mask 122-0 can inhibit transmitting and/or receiving according to the second communication standard as described herein.

At time t1, TWT SP 118-0 can end. In some embodiments, WLAN circuits 102 can enter another mode (e.g., lower power sleep mode) until a next TWT. At or about the same time, the second communications mask 122-0 can end. In some embodiments, a second communications mask 122-0 can automatically repeat following the TWT SP 118-0 (shown as 122-0').

At time t2, following a TWT interval 120, a new TWT SP 118-0 can begin. Another second communications mask 122-0 can also start at this time. In some embodiments, a timing signal (e.g., 115 in FIG. 1A) corresponding to a start of the TWT SP 118-0 can be used to time the start of the corresponding second communications mask 122-0.

In some embodiments, as TWTs are altered, a corresponding second communication mask can be altered. As but a few of many possible examples, as a duration of a TWT SP 118-0 changes, a duration of mask 1220-0 can change. As WLAN traffic in a TWT SP 118-0 changes, data for mask 1220-0 can change. As the timing of a TWT SP 118-0 changes, timing for mask 1220-0 can change. Further, as TWTs are cancelled, corresponding second communication mask can be cancelled or replaced with a differently configured mask (e.g., one that enables transmission and reception according to the second standard).

According to embodiments, a combination device can include WLAN circuits with collocated BT circuits that coexist on a 2.4 GHz medium. A combination device can define a SAM with a duration no less than the minimum duration of a TWT SP. Using TWT SP information passed from WLAN circuits to BT circuits via an interface, upon the creation or update of a TWT SP, BT slots type in the SAM can be marked based on the WLAN circuit's knowledge of the traffic pattern within the TWT SP. For example, in one case, all slots of the SAM can be marked as unavailable for BT Tx and Rx, hence yielding the medium to WLAN circuits entirely during the TWT SP. However, if WLAN circuits can predict a traffic direction and duration within a TWT SP, BT slots of the SAM corresponding to WLAN Tx/Rx periods can be marked as unavailable for BT Rx/Tx to avoid a transmitter interfering with a receiver on the combination device.

Given the built-in SAM handling mechanism in a BT compatible scheduler, the BT slots following a SAM anchor point can be excluded from BT Tx and/or Rx based on WLAN use type, so the medium can be used by WLAN circuits with appropriate access type (Tx/Rx).

In addition, a strobe signal can be sent from WLAN circuits to BT circuits corresponding to a start of TWT SP. Such a strobe can be used to synchronize corresponding SAM's anchor point (i.e., the SAM's starting point). As a TWT SP shifts, e.g., due to clocking drifting, the strobe signal can shift correspondingly and can be used to move the SAM anchor point, causing a BT scheduler to shift the BT activities that may be in conflict with WLAN operations.

Figure 2:
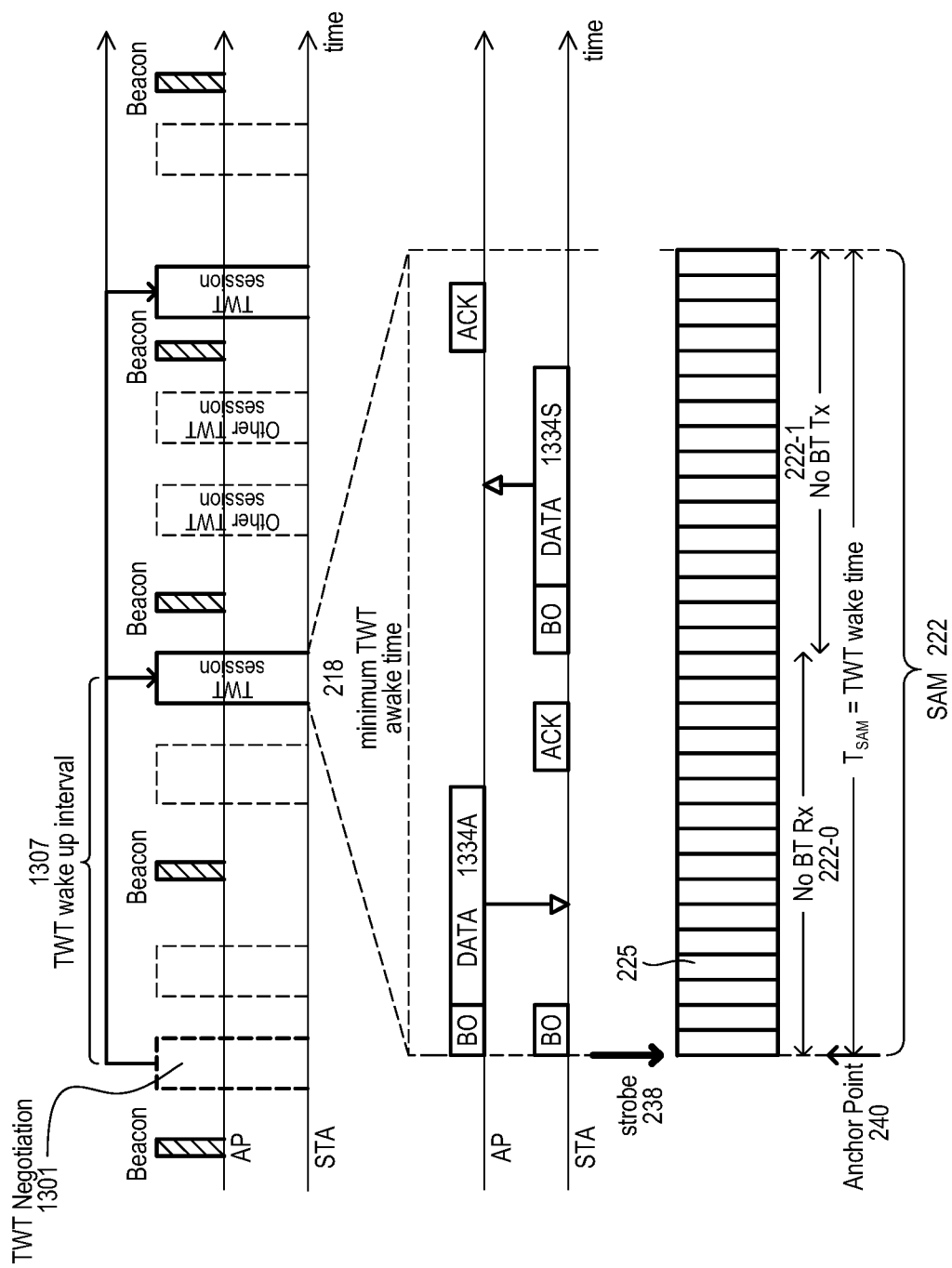
FIG. 2 includes timing diagrams showing a target wake time (TWT) session period (SP) compatible with an IEEE 802.11 wireless standard and a corresponding Bluetooth (BT) slot availability mask (SAM), according to an embodiment.
Figure 13:
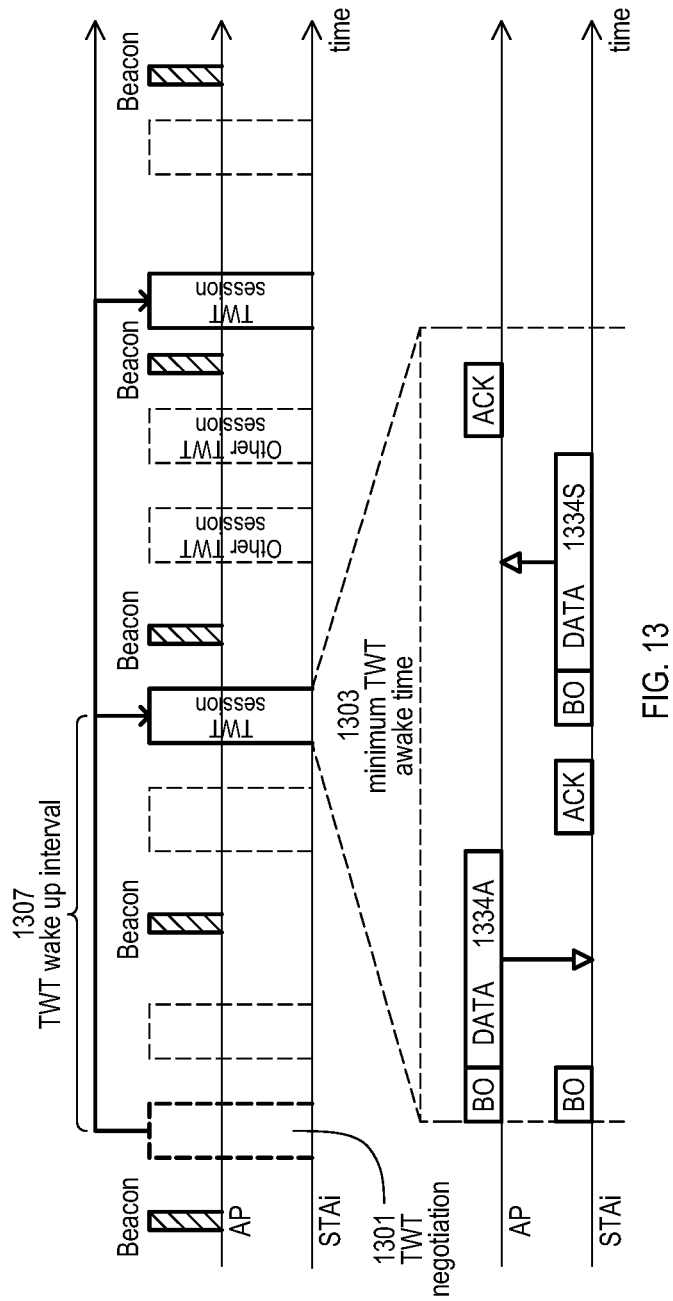
FIG. 13 is a timing diagram showing conventional TWT operations.

FIG. 2 shows timing diagrams like those of FIG. 13. However, FIG. 2 also shows a BT SAM 222 generated for the TWT SP 218 according to an embodiment. BT SAM 222 can be divided into a number of sections (one shown as 225) which can correspond to a time period. Each section 225 can correspond to one or more BT slots (i.e., time periods in which a BT master or BT slave can transmit or receive). BT SAM 222 can control BT communications for BT circuits collocated with the WLAN circuits that have established the TWT.

In the embodiment shown, BT SAM 222 has been configured to vary BT communications according to TWT SP traffic. Within TWT SP 218, downlink data 1334A can be transmitted from AP. During this time period, BT SAM 222 can be configured to inhibit reception of BT signals (shown as 222-0), but not the transmission of BT signals. Also during TWT SP 218, uplink data 1334S can be transmitted from STA to AP. During this time period, BT SAM 222 can be configured to inhibit transmission of BT signals (shown as 222-1), but not the reception of BT signals. It is understood that a SAM 222 can have any other suitable configuration. In the embodiment shown, a duration of BT SAM (TsAm) can be set to a TWT wake time (e.g., TWT SP).

Referring still to FIG. 2, a SAM 222 can be configured to be activated when the TWT SP 218 starts. In some embodiments, this can include BT circuits setting a SAM anchor point 240 according to a strobe signal 238 generated from WLAN circuits. In some embodiments, as the start of a TWT SP shifts (e.g., due to clock drift), the strobe 238 can shift. However, because SAM anchor point 240 is synchronized to strobe signal 238, as the TWT SP shifts, a BT scheduler within BT circuits can shift a SAM correspondingly to avoid conflicts with WLAN activities.

In this way, a SAM handing mechanism present in a BT scheduler can generate a SAM from WLAN data in which slots following a BT anchor point can be excluded from BT transmission (TX) or reception (RX) based on slot designation type provided by the BT SAM 222. A WLAN can use the shared medium (e.g., 2.4 GHz band) with an access type appropriate for the BT TX or RX masking.

Figure 3A:
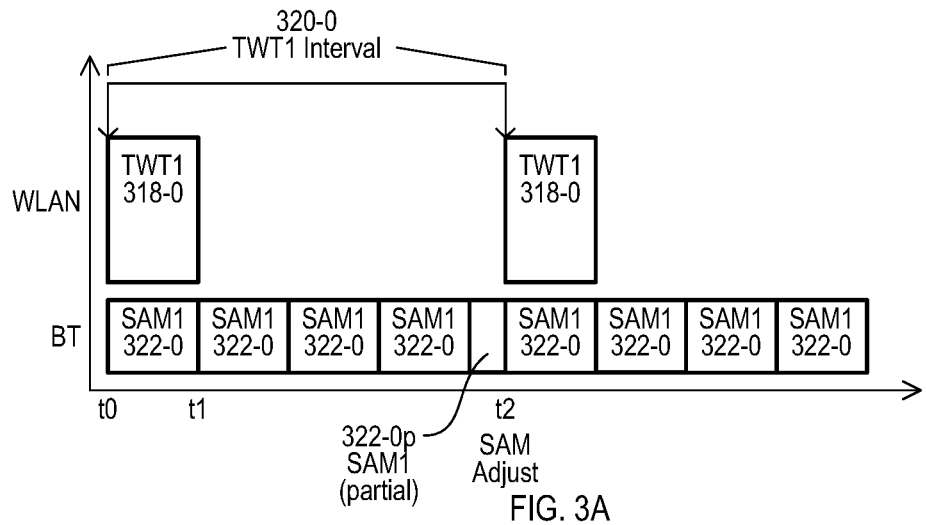
FIG. 3A to 3E are timing diagrams showing TWT SP and corresponding BT SAMs, according to various embodiments.
Figures 0, 3B:
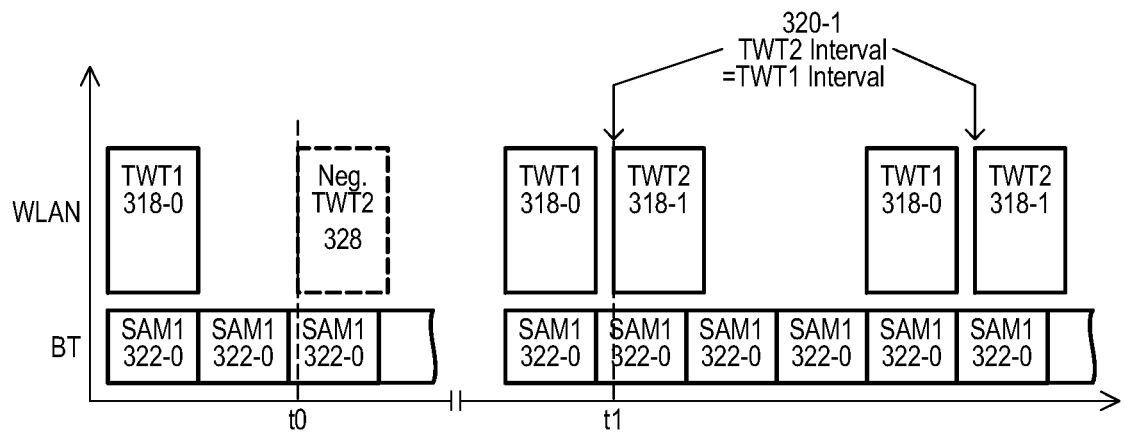
Figures 1, 3B:
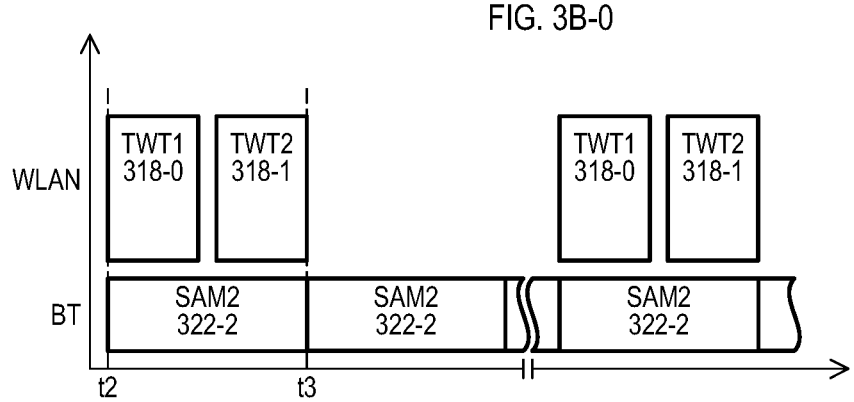
Figure 3C:
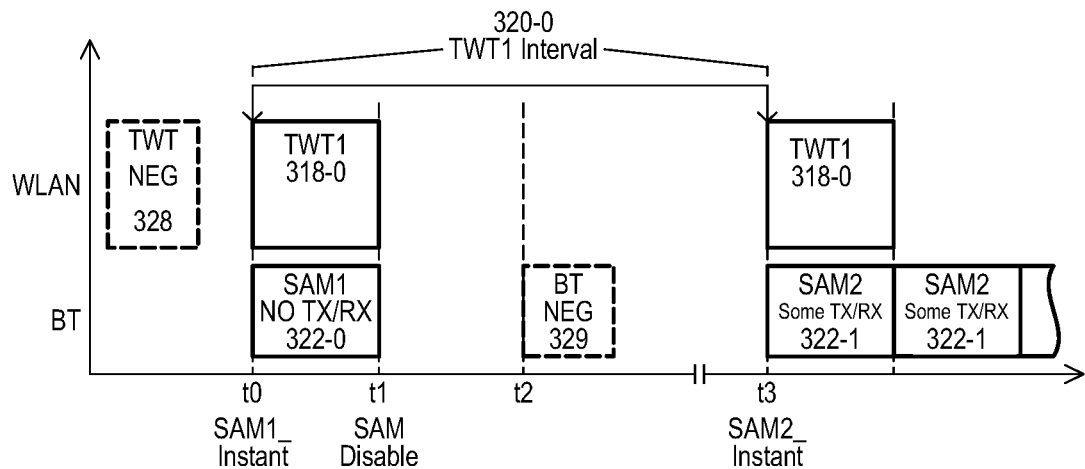

FIGS. 3A to 3E are timing diagram showing various coexistence operations according to embodiments. FIGS. 3A to 3C show operations for a combination device having WLAN and BT circuits, however, other embodiments can include a standard other than BT that can share a wireless medium with WLAN circuits.

FIG. 3A shows how a SAM start time (e.g., anchor point) can be adjusted to continue to coincide with a TWT SP start time. In FIG. 3A it is assumed a TWT1 has be established with a TWT interval 320-0.

At time t0, a TWT SP (shown as TWT1) 318-0 and SAM 322-0 can start. A SAM 322-0 can inhibit BT communications during TWT1 318-0, including varying BT operations according to expected WLAN traffic.

At time t1, a TWT1 318-0 and SAM 322-0 can end. However, a SAM 322-0 can continue to repeat in following time periods.

At time t2, a TWT interval 320-0 can pass, and another TWT1 318-0 can start. However, a current SAM 322-0p may still be in progress. Such an arrangement can arise from clock drift in either WLAN circuits or BT circuits or a TWT interval 320-0 not being an integer multiple of a SAM duration ($T_{SAM}$). In response to a timing signal from WLAN circuits (e.g., a strobe), BT scheduler circuits can cause a next SAM to start before SAM 322-0p has completed (e.g., change the SAM anchor point).

FIGS. 3B-0 and 3B-1 show how a SAM can be updated to cover a time period of more than one TWT SP.

Referring to FIG. 3B-0, prior to time t0, a first TWT (TWT1) can be negotiated to establish first TWT1 SPs 318-0 at a TWT1 interval 320-1. In addition, in response to mask data from WLAN circuits, BT circuits can establish a first SAM 322-0 corresponding to first TWT1 SP 318-0.

At time t0, a combination device can start a negotiation 328 with another device to establish a second TWT.

At time t1, a second TWT (TWT2) can be established having a same TWT interval 320-1 as the first TWT1. Further, a second TWT2 SP 318-1 can follow each first TWT1 SP 318-0, either immediately, or with some small separation in time. A first SAM 322-0 can continue to be in place that is timed to start with each first TWT1 SP 318-0 (and have the same duration as first TWT1 SP 318-0).

Referring to FIG. 3B-1, prior to time t2, in response to establishing second TWT2, WLAN circuits can generate mask data for a time period covering first and second TWT SPs (318-0 and 318-1). In response to such mask data, BT circuits can establish a second SAM 322-2 that can inhibit BT communications during both TWT SPs (318-0 and 318-1).

At time t2, in response to a timing signal generated by WLAN circuits, the second SAM 322-2 can be enabled. Unlike first SAM 322-0, second SAM 322-2 can have a duration that includes TWT1 SP 318-0 and TWT2 SP 318-1.

At time t3, second TWT2 SP 318-1 and SAM 322-2 can end. However, in the embodiment shown, second SAM 322-2 can continue to repeat itself.

FIG. 3C shows how different SAMs can be activated to control BT communications differently depending upon whether it is during a TWT SP or outside of a TWT SP. Prior to time t0, WLAN circuits of a combination device can negotiate 328 with another device to establish a TWT.

At time t0, in response to mask data and a timing signal from WLAN circuits, BT circuits can establish a first SAM 322-0 corresponding to the TWT SP 318-0.

However, it is not desirable to repeat the first SAM 322-0. In the embodiment shown, a first SAM 322-0 may inhibit both BT TX and BT RX communications.

At time t1, following the TWT SP 318, the SAM 322-0 can be disabled, allowing BT circuits to use slots without restriction.

At time t2, BT circuits can negotiate with one or more other BT devices 329 to establish a SAM compatible with the needs of such other BT devices.

At time t3, a TWT interval 320-0 can have elapsed and a next TWT SP 318-0 will start. BT circuits can enable a second SAM 322-1. In some embodiments, a second SAM 322-1 can mask BT transmission/reception according to expected WLAN reception/transmission, as well as designate other BT slots based on BT negotiation 329.

Figure 3D:
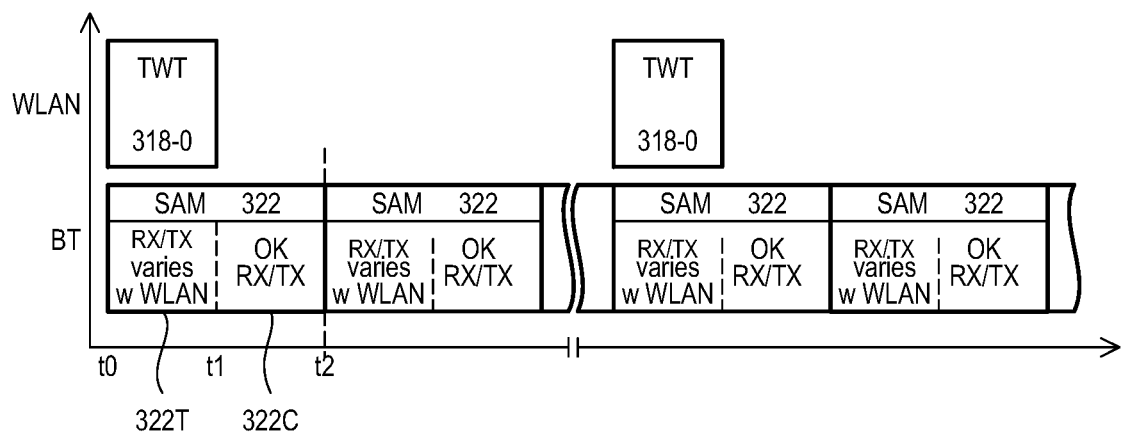

FIG. 3D shows how a SAM can be larger than a TWT SP. Prior to time t0, WLAN circuits of a combination device can negotiate 328 with another device to establish a TWT. A SAM 322 can be created having one portion 322T that covers a TWT SP 318-0 and another portion 322C that does not cover a TWT SP.

At time t0, SAM 322 can be enabled as TWT SP 318-0 begins. From time t0 to t1, SAM portion 322T can have values that limit BT RX and/or TX based on the TWT SP. This can include limiting all BT RX/TX or selectively limiting BT RX and/or BT TX based on WLAN traffic during the TWT SP.

At time t1, TWT SP 318-0 can end, but SAM 322 can continue with a next SAM portion 322C. In some embodiments, SAM portion 322C (i.e., a SAM portion that does not overlap a TWT SP) can be less restrictive than a SAM portion 322T corresponding to a TWT SP. In FIG. 3D, SAM portion 322C can have no BT RX or TX restrictions.

At time t2, SAM 322 can end.

It is understood that in embodiments having SAMs of greater duration than corresponding TWT SP durations, a TWT SP can be aligned at any suitable location within the SAM, with the SAM being synchronized with the TWT SP. That is, in some embodiments, a SAM can start before a TWT SP, however, the SAM can include a TWT portion (e.g., 322T) that is aligned with a start of the TWT SP. One example of such an arrangement is shown in FIG. 3E.

Figure 3E:
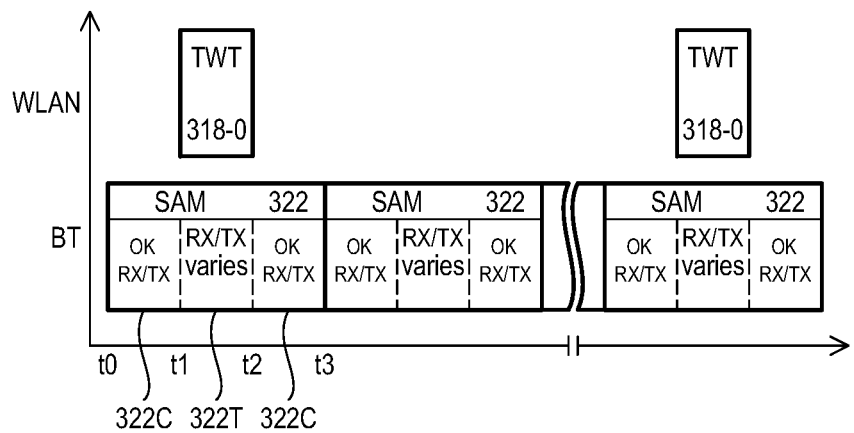

FIG. 3E shows a SAM 322 that can start before a TWT SP 318-0, but include BT restrictions that are aligned to the TWT SP.

At time t0, a SAM 322 can start. Such a start time can be synchronized with a TWT SP start time, but not aligned in time with the TWT SP. From times t0 to t1, a SAM portion 322C can have mask values unrelated to WLAN traffic for TWT SP 318-0.

At time t1, TWT SP 318-0 can begin. At about this time, SAM 322 can transition to SAM portion 322T, which can have restrictions based on the TWT SP 318-0 as described herein and equivalents.

At time t2, TWT SP 318-0 can end. At about this time, SAM 322 can transition to SAM portion 322C, which can have mask values unrelated to WLAN traffic for TWT SP 318-0.

In some embodiments, a combination device can include WLAN circuits with collocated BT circuits that can store BT submaps. A SAM can be created with the BT submaps according to WLAN traffic data of a TWT SP. FIGS. 4A and 4B are diagrams showing such an embodiment.

FIG. 4A shows example submaps 442-X that can be included in embodiments. Submaps 442-X can correspond to a portion (e.g., time period) of a SAM. A submap can correspond to a group of consecutive BT slot pairs. In the embodiment shown, submaps 442-X can include a submap that disallows BT reception (NO RX) (but allows BT transmission) 422-A, a submap that disallows BT transmission (NO TX) (but allows BT reception) 422-B, a submap that allows BT transmission and reception (OK RX/TX) 422-C, a submap that disallows BT reception or transmission (NO RX/TX) in a first portion and is OK RX/TX in a second portion 422-D, and a submap that is OK RX/TX in a first portion and NO RX/TX in a second portion 422-E.

FIG. 4B is a timing diagram showing expected WLAN traffic (WLAN) 402 in a TWT SP 418 and a corresponding SAM 422 for BT circuits 404. The SAM 422 can be composed of various submaps appropriate for the WLAN traffic.

From times t0 to t1, downlink data 434A is expected. Mask 422 can include two submaps 422-A and end with a submap 422-D to avoid conflicts with the WLAN traffic, while at the same time freeing up the medium for BT circuits starting in the second portion of submap 422-D.

From times t1 to t2 no WLAN traffic is expected. Mask 422 can include the latter portion of submap 422-D, a submap 422-C and a first portion of submap 422-E. This can indicate the medium is free for use by BT circuits in this time period.

From times t2 to t3, uplink data 434S is expected. Mask 422 can include the latter portion of submap 422-E, two submaps 422-B and a first portion of submap 422-E. Such submaps can help BT communications to avoid conflict with WLAN communications.

At time t4 a TWT SP 418 can end. At this time, the medium will be available for second communication circuits due to the latter half of submap 422-D.

Submaps of FIGS. 4A and 4B are provided by way of example. Submaps can take any suitable form, including having more than two differently masked sections. Further, embodiments that include a standard other than BT can have submaps of different duration. Further, embodiments can include fewer numbers of submaps, such as only two (e.g., 422-A and 422-B).

According to embodiments, a mask 422 can be generated in any suitable manner. In some embodiments, WLAN circuits can indicate start and end times for different traffic types (TX, RX), and BT circuits can select submaps for a SAM from such data. However, in other embodiments, WLAN circuits can generate a submap sequence from which BT circuits can construct a SAM. In some embodiments, WLAN circuits can provide submap data (i.e., slot codes for the submap) for BT circuits.

Figure 5:
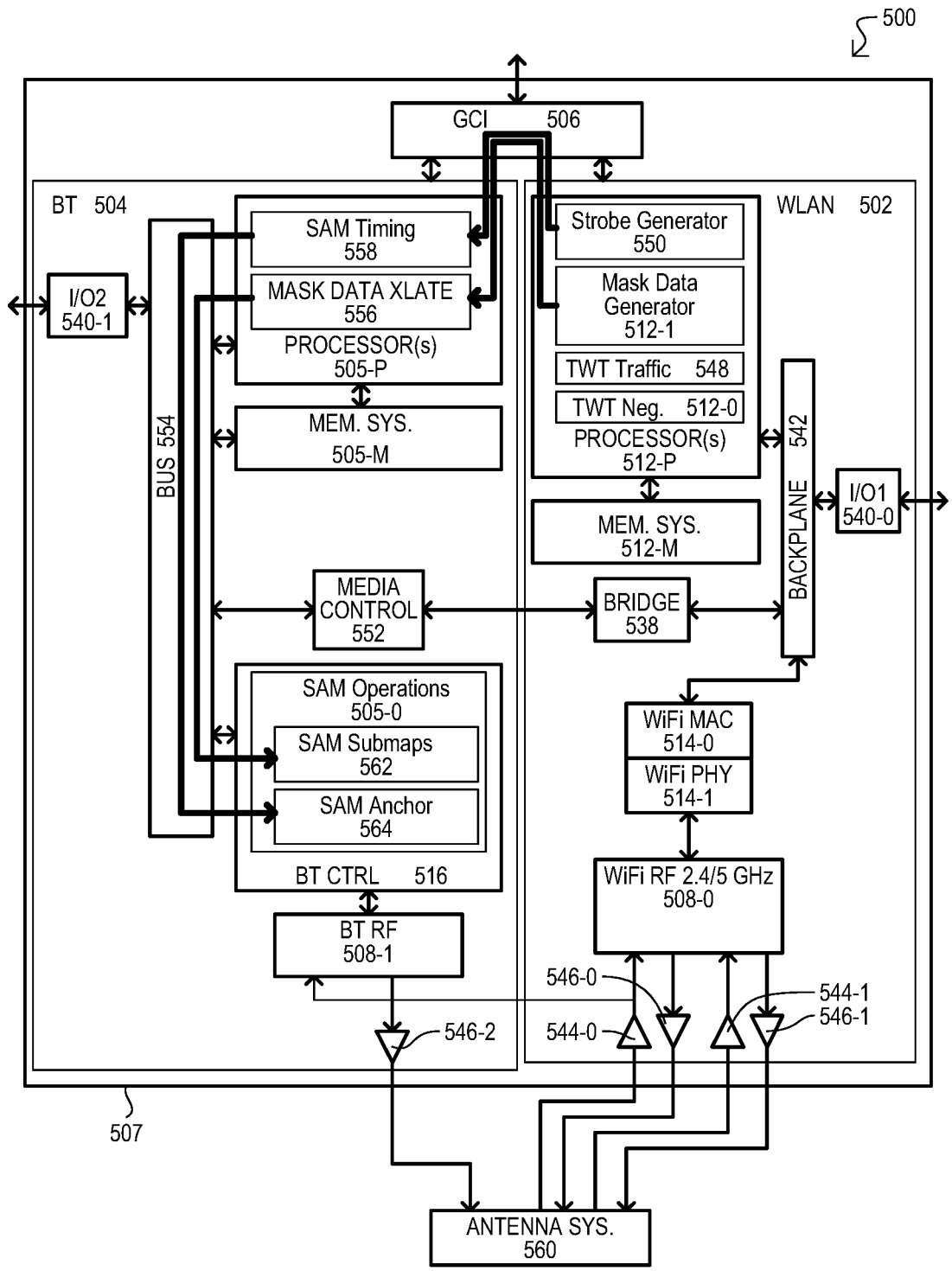
FIG. 5 is a block diagram of a WLAN-BT combination device according to an embodiment.

FIG. 5 is a block diagram of a combination device 500 according to another embodiment. In some embodiments, combination device 500 can be one particular implementation of that shown in FIG. 1A. A combination device 500 can include a WLAN section 502, a BT section 504 and a global coexistence interface 506. In some embodiments, combination device 500 can be a single integrated circuit device 507. A WLAN section 502 can include one or more WLAN processor(s) 512-P connected to a WLAN memory system 512-M, a bridge circuit 538, WLAN MAC circuits 514-0, WLAN PHY 514-1, WLAN RF circuits 508-0, and a first input/output (I/O) circuit 540-0 in communication with one another via a backplane 542. WLAN section 502 can perform operations compatible with the IEEE 802.11ax standard, as well as other IEEE 802.11 standards, such as IEEE 802.11ah. As such, WLAN section 502 can negotiate and establish a TWT for its WLAN communications if operating as a STA, or establish multiple TWTs with other devices if operating as an AP.

WLAN processor(s) 512-P can execute various WLAN related operations in response to instructions, which may or may not be stored in WLAN memory system 512-M. WLAN memory system 512-M can include volatile and/or nonvolatile memory for use by WLAN processors. A bridge circuit 538 can enable communication with BT section 504, for example, to control a common transmission media. First I/O circuits 540-0 can enable configuration and/or control of combination device 500. First I/O circuits 540-0 can include communication circuits compatible with any suitable method of communication. In some embodiments, first I/O circuits 540-0 can be compatible with one or more serial data communication standards/methods, including but not limited to: serial digital interface (SDI), universal serial bus (USB), universal asynchronous receiver transmitter (UART), I²C, or I²S.

WiFi RF circuits 508-0 can generate signals to transmit, and process signals received on one or more WLAN bands. In the embodiment shown, WiFi RF circuits 508-0 can operate on the 2.4 GHz band and 5 GHz band. WiFi RF circuits 508-0 can be connected to a 2.4 GHz low noise amplifier (LNA) 544-0, a 2.4 GHz power amplifier (PA) 546-0, a 5 GHz LNA 544-1, and 5 GHz PA 546-1.

GCI 506 can be connected to both the WLAN section 502 and the BT section 504. GCI 506 can provide a communication path for transferring data and signals between WLAN section 502 and BT section 504. In some embodiments, GCI 506 can also enable a combination device 500 to interface with other wireless systems, such as cellular network systems, including but not limited to systems compatible with 3G, 4G, LTE and 5G networks.

A WLAN section 502 can further include a TWT negotiator section 512-0, TWT traffic section 548, mask data generator section 512-1, and a strobe generator section 550. In some embodiments, such sections can be instructions executed by WLAN processor(s) 512-P. However, in other embodiments, all or a portion of the sections can include custom logic and/or memory circuits. TWT negotiator section 512-0 can negotiate with one or more other devices to establish a TWT as described herein, or equivalents. TWT traffic section 548, can, if possible, determine expected WLAN traffic within a TWT SP. Such operations can include TWT traffic section 548 acquiring such traffic data from sources on the combination device, receiving such traffic data from another device (e.g., via a PDU containing such data), or some combination thereof.

Mask data generator 512-1 can generate mask data corresponding to a TWT as described herein and equivalents. Mask data can identify a SAM duration, which may or may not match a TWT SP duration. In some embodiments, mask data can vary according to WLAN traffic within the TWT SP. In some embodiments, mask data can include SAM slot map data and/or submap data. Mask data generator 512-1 can transmit such mask data to BT section 504.

Strobe generator 550 can generate a timing signal corresponding to a start of a TWT SP, to enable BT section 504 to synchronize the activation of a SAM with the start of a TWT SP. A strobe generator 550 can generate a strobe signal with a periodicity related to its TWT SP. In some embodiments, strobe signal can be generated every TWT interval, or some integer multiple of the TWT interval.

In the embodiment shown, mask data can be transmitted from mask data generator 512-1 to BT section 504 through GCI 506. In addition, a strobe signal from strobe generator 550 can be transmitted to BT section 504 through GCI 506. However, alternate embodiments can use any other suitable data/signal path connecting collocated WLAN section 502 and BT section 504.

A BT section 504 can include one or more BT processor(s) 505-P, a BT memory system 505-M, media control circuits 552, BT control circuits 516, and second I/O circuits 540-1 in communication over a bus 554. BT processor(s) 505-P can execute various BT related operations in response to instructions which may or may not be stored in BT memory system 505-M. BT control circuits 516 can include circuits for performing functions according to one or more BT standards. Media control circuits 552 can communicate with WLAN section 502 over bridge circuits 538 to coordinate control of a medium. Second I/O circuits 540-1 can enable communication with the combination device 500 according to any of the embodiments described herein or equivalents.

A BT section 504 can also include BT RF circuits 508-1 that are controlled by BT control circuits 516. BT RF circuits 508-1 can generate signals to transmit, and process signals received on BT channels (e.g., frequency hop on 1 MHz or 2 MHz in the 2.4 GHz band). BT RF circuits 508-1 can be connected to a BT configured PA 546-2 and, in the embodiment shown, can share LNA 544-0.

A BT section 504 can further include a mask data translator 556 and SAM timing control 558. In some embodiments, such sections can be instructions executed by BT processor(s) 505-P. However, in other embodiments, all or a portion of the sections can include custom logic and/or memory circuits.

Mask data translator 556 can receive mask data from WLAN section 502 and apply it to BT control circuits 516 to configure a SAM mask for a TWT SP. Operations of a mask data translator 556 can take any suitable form according to the format of mask data received from WLAN circuits 502. As but a few of numerous possible examples, if mask data indicates timing of TWT SP events, mask data translator 556 can generate appropriate SAM data, e.g., number of slots pairs or submaps corresponding to TWT SP duration, type of masking needed for particular slots, whether SAM will repeat after TWT SP. However, if mask data is provided in a format understandable by BT section 504 (e.g., link manager protocol (LMP) sequences), such mask data can be forwarded to the appropriate circuits (e.g., BT control circuits 516).

SAM timing control 558 can receive a strobe signal from WLAN section 502 and use such a signal to synchronize the activation of a SAM with a corresponding TWT SP. In some embodiments, SAM timing control 558 can be used to establish an initial SAM anchor point (e.g., SAM_Instant), and thereafter adjust SAM timing operations to ensure a SAM anchor point is synchronized with a TWT SP. Such periodic re-alignment can take any suitable form. As but a few of many possible examples, in response to a strobe signal, SAM timing control can adjust a SAM offset value (e.g., $D_{SAM}$), a SAM start value (e.g., SAM_Instant) and/or a BT clock value.

BT control circuits 516 can include a SAM operations section 505-0 that can enable SAMs in response to SAM control values. SAM operations section 505-0 can include SAM submaps 562 and a SAM anchor point 564. In some embodiments, SAM values for SAM submaps 562 can be set by mask data translator 556 to include a masking value appropriate for a TWT SP. SAM submaps 562 can be arranged to form a SAM for the TWT SP. In some embodiments, a SAM anchor point 564 can be set by SAM timing control 558 to ensure a SAM is properly synchronized with a TWT SP.

A combination device 500 can also include an antenna system 560 connected to BT RF circuits 508-1 and WiFi RF circuits 508-0. Antenna system 540 can include one or more physical antennas, as well as switches for dynamically configuring connections to such antennas.

Figure 6:
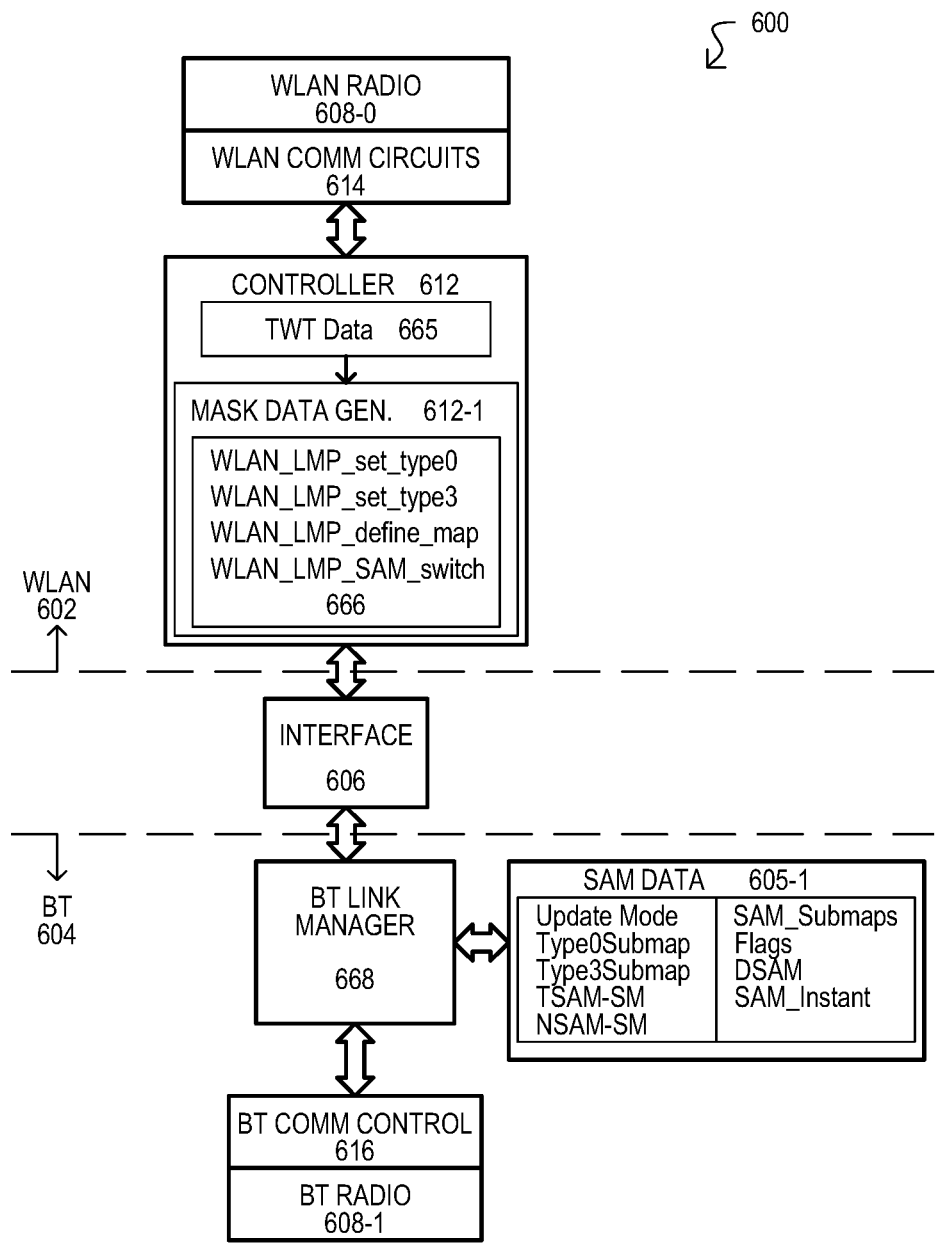
FIG. 6 is a block diagram of a WLAN-BT combination device according to another embodiment.

FIG. 6 is a block diagram of a combination device 600 according to another embodiment. A combination device 600 can include a WLAN section 602 and a BT section 604 in communication over interface 606. A WLAN section 602 can include WLAN radio circuits 608-0, WLAN communication circuits 614, and controller circuits 612. BT section 604 can include a BT link manager 668, SAM data 605-1, BT communication circuits 616 and BT radio circuits 606-1.

Interface 606 can include any suitable communication system, including wired connections, wireless connections and combinations thereof.

Operations of combination device 600 will now be described.

WLAN communications circuits 614 can negotiate one or more TWTs for a BSS using WLAN radio circuits 608-0. From the established TWT(s), controller circuits 612 can derive TWT data 665. TWT data 665 can include, but is not limited to, start times for each TWT, durations for each TWT (which can be minimum durations), and expected WLAN traffic patterns for each TWT, if available.

In response to TWT data, mask data generator 612-1 can generate mask data 666 for use by BT section 604. In the embodiment shown, mask data 666 can include sequences executable by BT section 604 to control SAM operations. In the embodiment shown, sequences can include, but are not limited to: WLAN_LMP_set_type0, WLAN_LMP_set_type3, WLAN_LMP_define_map and WLAN_LMP_SAM_switch. Such sequences can include the same data and/or have the same format as corresponding BT LMP sequences, with the exception of WLAN_LMP_set_type3. For example, WLAN_LMP_set_type0 can follow the format of a BT sequence LMP_set_type0, WLAN_LMP_define_map can follow the format of a BT sequence LMP_define_map, and WLAN_LMP_SAM_switch can follow the format of a BT sequence WLAN_LMP_SAM_switch. WLAN_LMP_set_type3 can define slots in a "type3" submap. As understood from herein, the sequences can configure a SAM corresponding to a TWT SP as well as activate the SAM during the TWT SP. In some embodiments, WLAN_LMP_set_type0 and WLAN_LMP_set_type3 can define submaps for a SAM (e.g., NO TX, NO RX). WLAN_LMP_define_map can define the SAM including a duration (e.g., length of submaps and number of submaps) as well as type of submaps. WLAN_LMP_SAM_switch can control timing of the SAM to match a TWT SP (e.g., SAM_Instant, $D_{SAM}$) including adjusting SAM timing in case of clock drift or the like.

BT link manager 668 can receive sequences over interface 606, and in response, establish SAM data 605-1 for controlling SAM operations. SAM data 605-1 can take any suitable form for the type of SAM(s) employed. In the embodiment of FIG. 6, SAM data 605-1 can include any of: Update Mode, which can indicate when submaps (e.g., type0 and/or type3) are effective or invalidated; Type0Submap, which defines RX/TX restrictions for slots of one submap; Type3Submap, which defines RX/TX restrictions for another submap; TSAM-SM, which can define the number of slots in a submap; NSAM-SM, which can define the number of submaps in a SAM; SAM_submaps which can define the type of submaps in a SAM; Flags, which can control timing of SAM control operations; DSAM, which can define an offset of a SAM anchor point from a BT master clock reference point; and SAM_Instant, which can define a first anchor point for a new SAM.

Based on SAM data 605-1, BT communication circuits 616 can limit BT transmission and reception by BT radio circuits 608-1 during a TWT SP.

Figure 7:
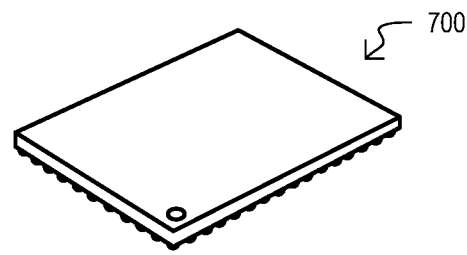
FIG. 7 is a perspective view of a WLAN-BT combination integrated circuit device according to an embodiment.

While embodiments can include devices with various interconnected components, embodiments can include combination devices having a unitary structure, which can establish one or more TWTs according to an IEEE 802.11 wireless standard, and mask transmission of a second wireless standard during the TWTs. Such unitary devices can be advantageously compact single integrated circuit (IC) devices. FIG. 7 shows one particular example of a combination device 700 formed in a single IC package. In some embodiments, combination device 700 can include a single die in the package. However, it is understood that a combination device according to embodiments can include any other suitable integrated circuit packaging type, as well as direct bonding of a combination device die onto a circuit board or substrate.

While embodiments can include compact systems, such as integrated circuit packages, embodiments can also include systems employing multiple devices on multiple networks, with such networks operating according to different communication standards. One such embodiment is shown in FIG. 8.

Figure 8:
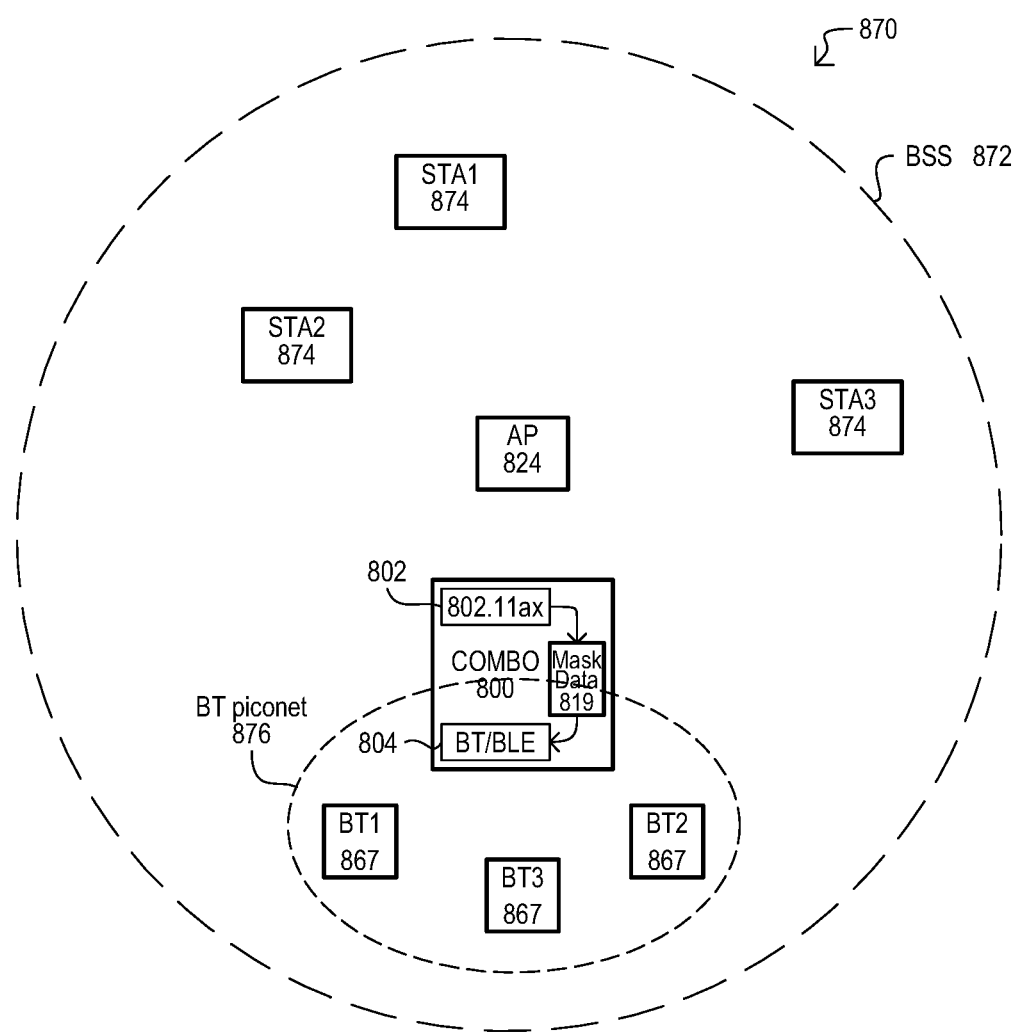
FIG. 8 is a block diagram of a system according to an embodiment.

FIG. 8 is a diagram showing a system 870 according to an embodiment. A system 870 can include a combination device 800, other WLAN devices, including an AP 824 and STA 874, and other BT devices 867. A combination device 800 can include WLAN circuits 802 compatible with at least the IEEE 802.11ax standard and BT circuits 804.

Combination device 800 and WLAN devices (824, 874) can form a BSS 872 and can communicate with another according to the IEEE 802.11ax standard. In some embodiments, a combination device 800 can operate as a STA and negotiate a TWT with AP 824. In other embodiments, a combination device 800 can operate as an AP and can negotiate TWTs with any other compatible STAs. From negotiated TWTs, WLAN circuits 802 can generate mask data 819 according to any of the embodiments described herein and equivalents. Mask data 819 can be provided to collocated BT circuits 804.

Combination device 800 and other BT devices 867 can form a BT piconet 876 and communicate with one another according to one or more BT standards. BT circuits 804 can generate a SAM from mask data 819 and enable the SAM at the start of a TWT SP for WLAN circuits 802. Such masking of BT transmissions during a TWT can take the form of any of the embodiments described herein and equivalents. In some embodiments, BT circuits 804 can operate as a BT master in piconet 876. In some embodiments, BT circuits 804 can operate as a BT slave in piconet 876.

Figure 9A:
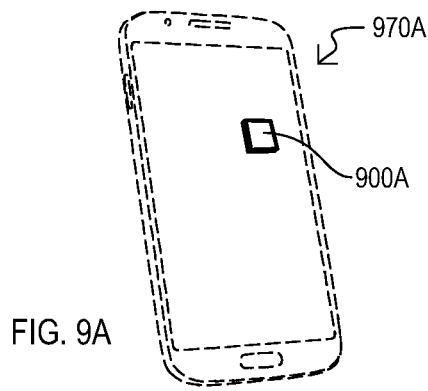
FIGS. 9A to 9D are diagrams of various systems according to embodiments.

Referring to FIGS. 9A to 9D, various other systems according to embodiments are shown in a series of diagrams. FIG. 9A shows a handheld computing device 970A. Handheld computing device 970A can include a combination device 900A that can establish a TWT on an IEEE 802.11 wireless network, and selectively mask transmissions according to one or more other wireless standards with masks that correspond to TWT SP, as described herein and equivalents.

Figure 9B:
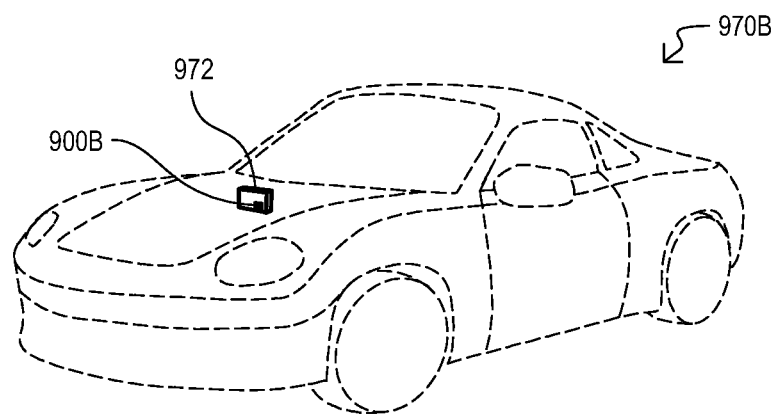

FIG. 9B shows an automobile system 970B according to an embodiment. Automobile system 970B can have numerous sub-systems, including a communication subsystem 972. In some embodiments, a communication subsystem 972 can enable an automobile to provide WiFi communications as well as enable other devices to pair to the system via one or more BT standards. Communication subsystem 972 can include a combination device 900B as described herein, or equivalents. Combination device 900B can serve as an AP or part of an AP. In such an arrangement, combination device 900B can enable more efficient use of a 2.4 GHz band with devices connected according to another standard (e.g., BT).

Figure 9C:
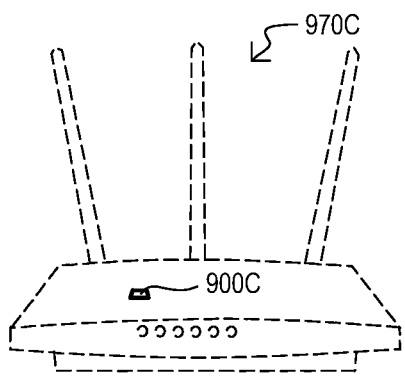

FIG. 9C shows a router device 970C. Router device 970C can provide routing functions according to the IEEE 802.11ax standard, while also enabling access via a closer range wireless standard (e.g., Bluetooth). Router device 970C can include a combination device 900C as described herein or an equivalent.

Figure 9D:
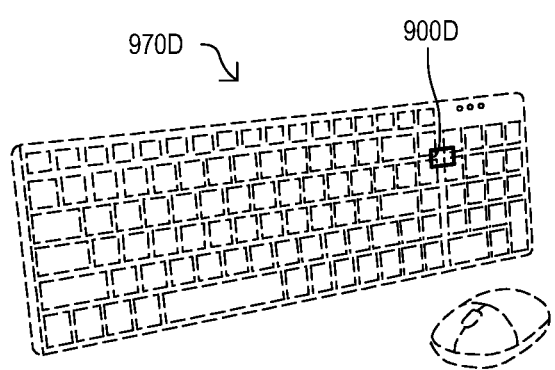

FIG. 9D shows a human interface device (HID) 970D. HID 970D can enable a person to interact or control other devices and should not be construed as limited to any particular HID. As but a few of many possible examples, HID 970D can control a computing system, manufacturing equipment or any other suitable systems. HID 970D can include a combination device 900D as described herein, or equivalents.

While embodiments can include any of the method described above with reference to the various devices and systems, additional methods will now be described with reference to flow diagrams.

Figure 10:
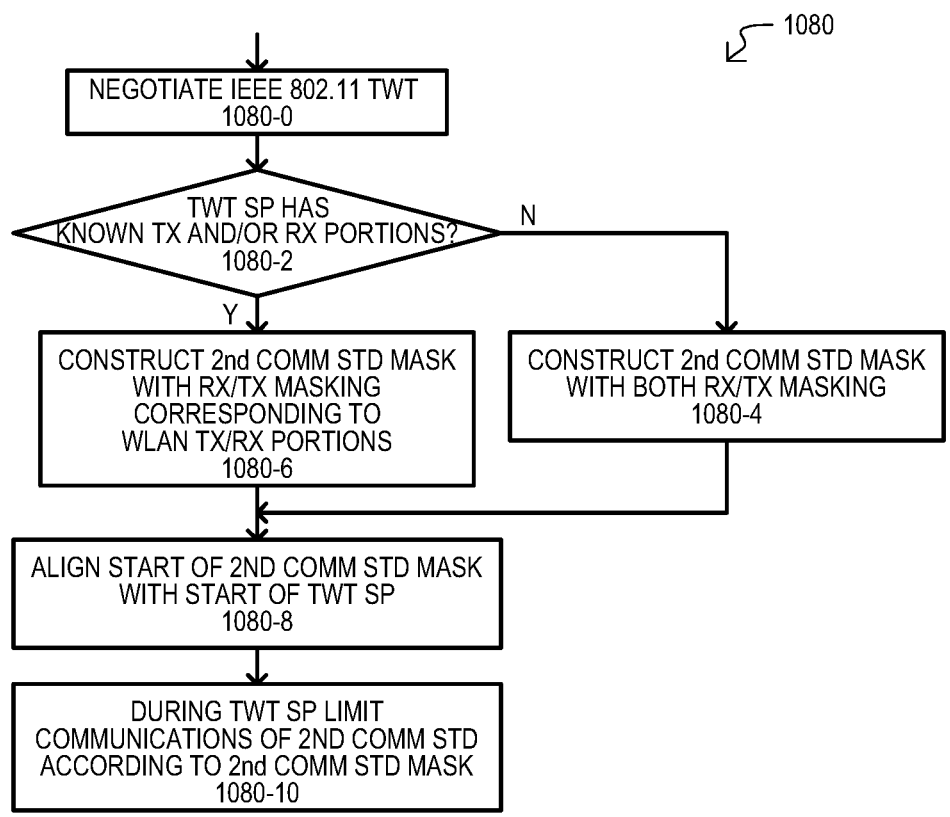
FIG. 10 is a flow diagram of a method for masking communications according to a second wireless standard during a TWT, according to an embodiment.

FIG. 10 is a flow diagram of a method 1080 for masking communications according to a secondary wireless standard during an IEEE 802.11 TWT. A method 1080 can be executed by a combination device as described herein and equivalents.

A method 1080 can include negotiating an IEEE 802.11 TWT 1080-0. Such an action can include WLAN circuits transmitting or detecting a beacon and executing a negotiation process with another device to establish a TWT. A TWT can be compatible with any suitable IEEE 802.11 wireless standard, including but not limited to the IEEE 802.11ax and/or IEEE 802.11ah standards.

A method 1080 can determine if a TWT SP has known TX and/or RX portions 1808-2. Such an action can include WLAN circuits determining WLAN traffic for a TWT SP of the negotiated TWT. WLAN traffic can include any of: when incoming WLAN transmission are expected, when outgoing transmissions are expected or when no WLAN communications are expected. If the TWT SP does not have known TX and RX portions (N from 1080-2), a method 1080 can construct a second communications standard mask with both RX and TX masking 1080-4.

If the TWT SP has known TX and/or RX portions (Y from 1080-2), a method 1080 can construct a second communications standard mask that has RX and TX masking corresponding to WLAN TX and RX portions 1080-6. Such an action can include generating mask values that can inhibit reception according to the second communication standard when data are expected to be incoming to the WLAN circuits, and that can inhibit transmission according to the second communication standard when data are expected to be transmitted from the WLAN circuits.

A method 1080 can align a start of the second communication standards mask with the start of the TWT 1080-8. Such an action can include starting a second communication standards mask for the first time at the start of a TWT. Such an action can also include periodically adjusting the timing of a repeating second communication standards mask to ensure it is properly synchronized with a TWT SP.

During a TWT SP communications according to the second communications standard can be limited according to the second communications standard mask 1080-10. Such an action can include inhibiting RX, TX or both for communications according to the second communications standard.

Figure 11:
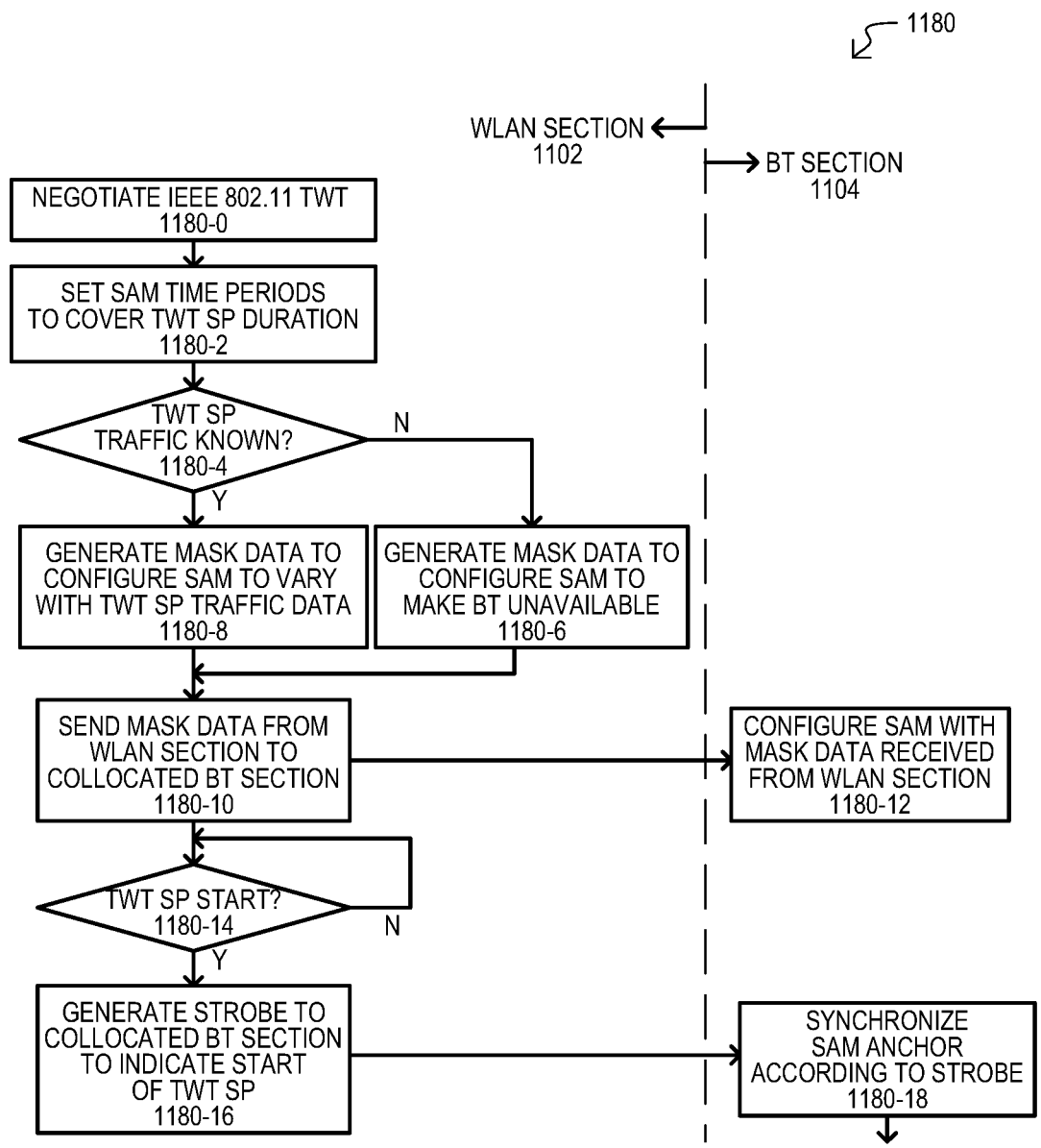
FIG. 11 is a flow diagram of a method for creating a BT SAM for a TWT according to an embodiment.

FIG. 11 is a flow diagram of a method 1180 for creating a BT SAM for a TWT according to an embodiment. A method 1180 can be executed by a combination device having a WLAN section 1102 and a BT section 1104. A method 1180 can include negotiating an IEEE 802.11 TWT 1180-0. Such an action can include those noted for 1080-0 in FIG. 10.

A method 1108 can include setting SAM time periods sufficient to cover a TWT SP duration 1180-2. In some embodiments, such an action can include determining a number of BT slots in a TWT SP. In some embodiments, such an action can include establishing a number of slots in a submap, and determining a number of submaps in a TWT SP. It is noted that a SAM can extend longer than a TWT SP, but have a portion that restricts BT RX and/or RX during the TWT SP.

A method 1180 can determine if traffic for the TWT SP is known 1180-4. Such an action can include determining if expected or actual WLAN transmission or reception times for the TWT are known. If TWT SP traffic is not known (N from 1180-4), a method 1180 can generate mask data to configure a SAM to make BT unavailable 1180-6 during the TWT SP. Such an action can include generating mask data that can result in a SAM having slot type codes and/or submap configurations that disallow BT transmission and reception during the TWT SP.

If TWT SP traffic is known (Y from 1180-4), a method 1180 can generate mask data to configure a SAM to vary BT RX/TX according to WLAN traffic during the TWT SP 1180-8. In some embodiments, such an action can include generating mask data that can result in a SAM having portions with BT RX restrictions and/or BT TX restrictions corresponding to WLAN TX and/or RX periods.

Mask data can be sent from a WLAN section to a collocated BT section 1180-10. Such an action can include sending such mask data in any suitable manner, including via wired or wireless paths. In some embodiments, such an action can include sending mask data over an interface between a WLAN section and BT section.

A BT section can configure a SAM with mask data received from a collocated WLAN section 1180-12. Such an action can include any of those described herein, or equivalents.

When a TWT SP is to start (Y from 1180-14), a WLAN section can generate a strobe to a collocated BT section to indicate a start of a TWT SP 1180-16. A strobe can take any suitable form, including a single signal, or data indicating a time (e.g., timestamp). A strobe can be sent in any suitable manner, including via wired or wireless paths. In some embodiments, such an action can include sending a strobe over an interface between a WLAN section and BT section.

A BT section can synchronize a SAM anchor according to a strobe received from a collocated WLAN section 1180-18. Such an action can include timing a SAM to start with a predetermined relationship to a start of the TWT SP. In some embodiments, such an action can include starting a SAM at the same time a TWT SP starts.

Figure 12:
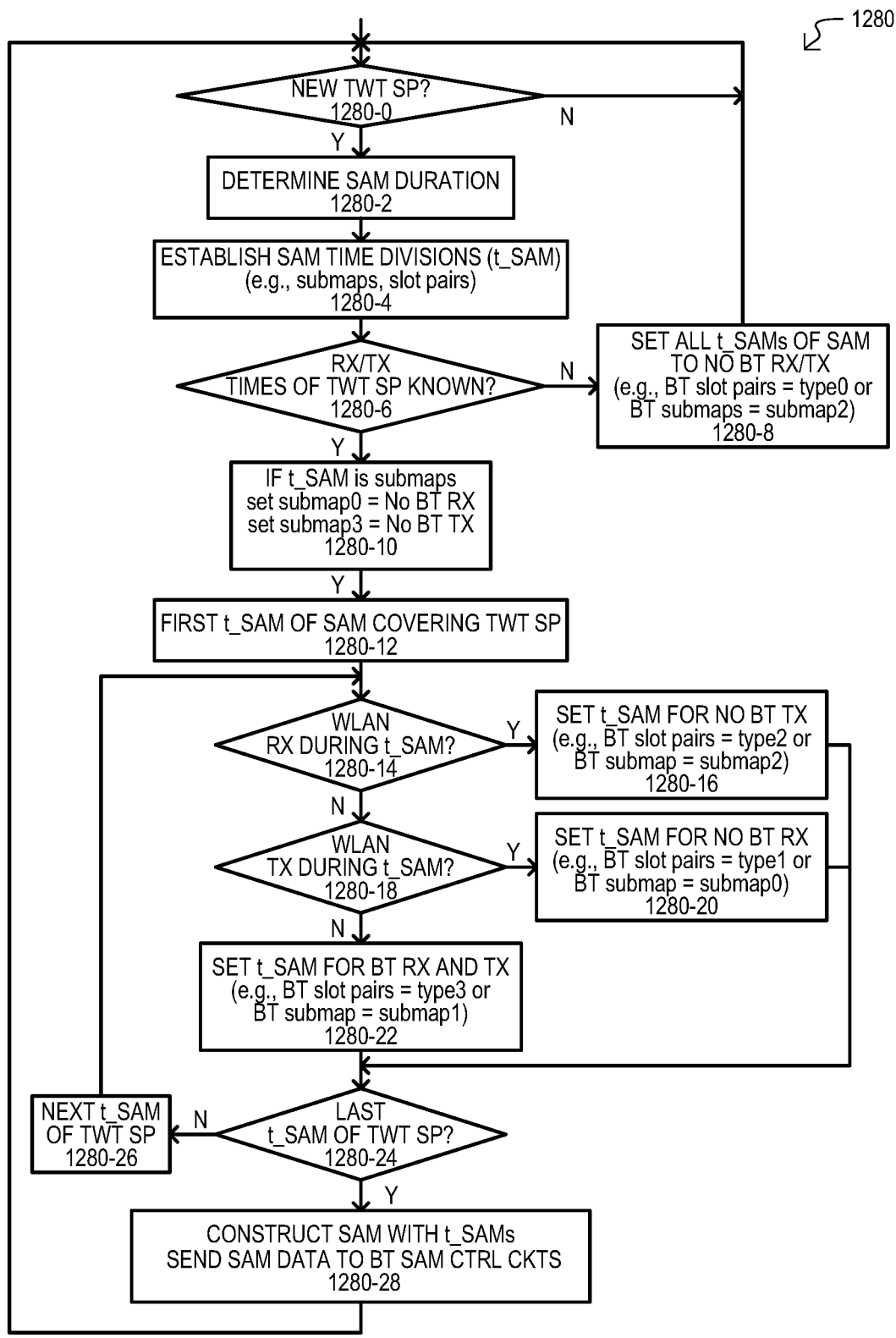
FIG. 12 is a flow diagram of a method for creating a BT SAM from WLAN traffic information according to an embodiment.

FIG. 12 is a flow diagram of a method 1280 for creating a BT SAM from WLAN traffic information according to an embodiment. A method 1180 can be executed by WLAN circuits and/or BT circuits of a combination device. A method 1280 can include determining if a new TWT has been established 1280-0. Such an action can include WLAN circuits negotiating a TWT as described herein.

A method 1280 can determine a SAM duration 1280-2. Such an action can include determining a SAM duration sufficient to match a TWT SP. In some embodiments, a SAM duration can be determined to match, or match as closely as possible, a TWT SP duration. However, in other embodiments, a SAM duration can be longer than a TWT SP. A method 1280 can establish SAM time divisions (t_SAM) 1280-4. Such an action can include organizing a SAM into consecutive time periods t_SAM. Such time periods t_SAM can have a same duration or have different durations. In some embodiments, time periods t_SAM can be BT slot pairs. In some embodiments, time periods t_SAM can be BT submaps.

A method 1280 can determine if RX and/or TX times of the TWT SP are known 1280-6. Such an action can include relying on WLAN traffic data derived from negotiating a TWT or receiving such data from another device. If RX/TX times of the TWT SP are not known (N from 1280-6), all t_SAMs of the SAM can have values set for no BT RX/TX 1280-8. In embodiments in which t_SAMs are slot pairs, slot pair values for the SAM can be set to type0. In embodiments in which t_SAMs are BT submaps, the BT submaps of the SAM can be set to type submap2.

If RX/TX times of the TWT SP are known (Y from 1280-6), and time divisions are submaps, a method 1280 can set a submap0 to NO BT RX (but allow BT RX) and set a submap3 to NO BT TX (but allow BT RX) 1280-10.

A method 1280 can then set a SAM masking value for each t_SAM period of the SAM based on known WLAN traffic. Starting with a first t_SAM (1280-12), if a WLAN RX is expected during the t_SAM (Y from 1280-14), the t_SAM can be set for NO BT TX 1280-16. If a t_SAM is in slot pairs, this can include setting such slot pairs to type2. If a t_SAM is a submap, this can include setting the submap to submap3 1280-16. If a WLAN TX is expected during the t_SAM (Y from 1280-18), the t_SAM can be set for NO BT RX 1280-20. If a t_SAM is in slot pairs, this can include setting such slot pairs to type1. If a t_SAM is a submap, this can include setting the submap to submap0 1280-20. If a WLAN TX or RX is not expected during the t_SAM (N from 1280-22), the t_SAM can be set for both BT RX and TX 1280-22. If a t_SAM is in slot pairs, this can include setting such slot pairs to type3. If a t_SAM is a submap, this can include setting the submap to submap1 1280-22. Such actions can repeat until a last t_SAM of the SAM has been assigned a masking value (1280-26 and 1280-24).

When all t_SAMs of the SAM have been assigned masking values (Y from 1280-28) a method 1280 can construct a SAM with the t_SAM, and send data for the SAM to BT SAM control circuits of a combination device 1280-28. A method 1280 can then return to 1280-0.

Embodiments can provide for efficient sharing of a transmission medium with advantageously simple setup steps. A WLAN circuit can establish a TWT without regard to BT activities. BT circuits can then adapt to WLAN TWT scheduling by using SAMs appropriate for the TWT. In some embodiments, BT circuits can use existing SAM capable scheduling mechanisms. Embodiments do not have to adjust WLAN operations in the event of clock drift between BT and WLAN circuits. Drifting of a TWT SP wakeup time can be conveyed to BT circuits via strobe signal, resulting in BT circuits shifting a SAM anchor point.

Advantageously, asynchronous and non-periodic BT medium requests arising from multiple BT links of different profiles may pose no problem to WLAN operations, as WLAN circuits can maintain TWT timing, with SAM masking providing timely responses to such requests.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim.

Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
by operation of communication circuits compatible with an IEEE 802.11 wireless standard (WLAN circuits), negotiating a target wake time (TWT) with a TWT session period (TWT SP) duration;
generating mask data for a duration no less than the TWT SP duration, the mask data indicating inhibition of communications according to a second standard during at least a portion of TWT SP;
sending the mask data to second communication circuits collocated with the WLAN circuits on a same integrated circuit device;
sending a timing signal to the second communication circuits that indicates a start of a TWT SP; and
by operation of the second communication circuits,
generating a communications mask from the mask data received from the WLAN circuits,
in response to the timing signal, synchronizing the communications mask with the TWT SP, and
in response to the communications mask, inhibiting communications according to the second standard during at least a portion of the TWT SP; wherein
the WLAN circuits and second communication circuits operate over wireless bands that overlap with one another and the second standard is not an IEEE 802.11 wireless standard.

2. The method of claim 1, wherein:
the WLAN circuits are compatible with a standard selected from the IEEE 802.11ax standard and the IEEE 802.11ah standard.

3. The method of claim 1, further including:
if expected WLAN traffic information for the TWT SP is not available,
generating mask data for a duration no less than the TWT SP duration, the mask data indicating inhibition of communications according to the second standard during the TWT SP; wherein
by operation of the second communication circuits,
in response to the communications mask, inhibiting both transmission and reception according to the second standard during the entirety of TWT SP.

4. The method of claim 1, further including:
if expected WLAN traffic information for the TWT SP is available,
generating the mask data that varies inhibitions on communications according to the second standard based on the WLAN traffic information.

5. The method of claim 4, wherein:
generating the mask data includes any selected from the group of:
prohibiting transmissions according to the second standard when WLAN transmissions are expected to be transmitted by the WLAN circuits during the TWT SP; and
prohibiting reception of signals according to the second standard when WLAN transmissions are expected to be received by the WLAN circuits during the TWT SP.

6. The method of claim 1, wherein:
the second standard is a Bluetooth standard, including Bluetooth Low Energy (BT); and
the communications mask is a BT Slot Availability Mask (SAM).

7. The method of claim 6, wherein:
synchronizing the communications mask includes establishing a SAM anchor point in response to the timing signal, the SAM anchor point indicating the start of the SAM.

8. The method of claim 6, further including:
the SAM comprises a plurality of submaps, each submap indicating an availability of BT transmission and reception for a plurality of BT slots;
configuring at least one submap to having slot masking selected from:
prohibiting BT transmission while enabling BT reception, and
prohibiting BT reception while enabling BT transmission; and
if expected WLAN traffic information for the TWT SP is available, including the at least one submap as a portion of the SAM.

9. A device, comprising:
circuits compatible with at least one IEEE 802.11 wireless standard (WLAN circuits) configured to
negotiate a TWT having a TWT session period (TWT SP) duration,
generate mask data for a communication mask having a duration no less than the TWT SP duration, the communication mask indicating at least one time period in which communications according to a second standard are inhibited;
sending the mask data to second communication circuits collocated with the WLAN circuits on a same integrated circuit device;
generating a timing signal that indicates a start of a TWT SP; and
second communication circuits configured to
generate a communications mask from the mask data,
in response to the timing signal, synchronize the communications mask with the TWT SP, and
in response to the communications mask, inhibit communications of the second standard during at least a portion of the TWT SP;
radio circuits configured to transmit and receive signals over at least a first radio frequency (RF) band for WLAN communications and transmit and receive signals over at least a second RF band for communications of the second standard; wherein
the WLAN circuits, second communication circuits, WLAN radio circuits and second radio circuits are formed in a same integrated circuit package, and
the first RF band overlaps at least a portion of the second RF band.

10. The device of claim 9, wherein:
the WLAN circuits are configured to,
if WLAN traffic information for the TWT SP is not available, generate mask data that results in communications according to the second standard being inhibited throughout the TWT SP, and
if WLAN traffic information for the TWT SP is available, generate mask data that results in communications according to the second standard being inhibited according to the WLAN traffic information.

11. The device of claim 9, wherein:
the WLAN circuits, second communication circuits, WLAN radio circuits and second radio circuits are formed with a same integrated circuit substrate.

12. The device of claim 9, wherein:
the second communication circuits comprise BT circuits compatible with at least one Bluetooth (BT) standard, including Bluetooth Low Energy;
the communications mask comprises a BT Slot Availability Map (SAM); and
the BT circuits are configured to establish a SAM anchor point in response to the timing signal.

13. The device of claim 9, further including:
interface circuits configured to transfer the mask data from the WLAN circuits to the second communication circuits.

14. The device of claim 9, wherein:
the second communication circuits comprise BT circuits compatible with at least one Bluetooth standard, including Bluetooth Low Energy (BT circuits);
the communications mask comprises a BT Slot Availability Map (SAM); and
the BT circuits are configured to
generate at least one BT SAM submap in response to configuration data from the WLAN circuits, and
create the SAM with the at least one BT SAM submap.

15. A system, comprising:
a combination device configured to wirelessly communicate with first devices according at least one IEEE 802.11 wireless standard (WLAN) and with second devices according to a second standard, the combination device including
WLAN circuits configured to
negotiate with at least one first device to communicate with the first device during a target wake time (TWT) having session period (TWT SP) with a duration,
generate mask data for a communication mask having a duration no less than the TWT SP duration, the mask data indicating when communications according to the second standard are prohibited,
generating a timing signal that indicates a start of a TWT SP; and
second communication circuits configured to communicate with second devices over a network according to the second standard, the second communication circuits configured to
generate a communications mask from the mask data,
in response to the timing signal, synchronize the communications mask with the TWTSP,
in response to the communication mask, inhibit communications according to the second standard during at least a portion of the TWT SP, and
an antenna system configured to transmit and receive signals over at least a first radio frequency (RF) band for communications according to the at least one IEEE 802.11 wireless standard and transmit and receive signals over at least a second RF band for communications according to the second standard, the first RF band overlapping at least a portion of the second RF band.

16. The system of claim 15, wherein:
the WLAN circuits are configured to communicate with the TWT over a basic service set that includes at least one first device; and
the second communication circuits comprise BT circuits compatible with at least one Bluetooth standard, including Bluetooth Low Energy, the BT circuits configured to communicate with at least one second device over a piconet.

17. The system of claim 15, wherein:
the WLAN circuits are configured to
if WLAN traffic information for the TWT SP is not available, generate mask data that results in communications according to the second standard being prohibited throughout the TWT SP, and
if WLAN traffic information for the TWT SP is available, generate mask data that results in varying an inhibition of communications according to the second standard according to the WLAN traffic information.

18. The system of claim 15, wherein:
the second communication circuits comprise BT circuits compatible with at least one Bluetooth standard, including Bluetooth Low Energy; and
the communications mask comprises a Slot Availability Mask (SAM).

19. The system of claim 18, wherein:
the BT circuits are configured to
generate at least one BT submap from the mask data, the BT submap indicating BT transmission and reception allowances for a plurality of BT slots, and
generate the SAM with the at least one BT submap.

20. The system of claim 15, wherein:
the combination device includes interface circuits configured to transfer the mask data from the WLAN circuits to the second communication circuits; wherein
the WLAN circuits, second communication circuits and interface circuits are formed with a same integrated circuit substrate.

* * * * *